(12) United States Patent
Marciano et al.

(10) Patent No.: US 10,166,498 B2
(45) Date of Patent: Jan. 1, 2019

(54) GAS-EVACUATING FILTER

(71) Applicant: Hayward Industries, Inc., Elizabeth, NJ (US)

(72) Inventors: Edward Lawrence Marciano, Lexington, NC (US); Jacob Cody Smith, Lexington, NC (US); Jeromy Elwood Higgins, Clemmons, NC (US); Joseph Anthony Tessitore, Clemmons, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 483 days.

(21) Appl. No.: 14/805,913

(22) Filed: Jul. 22, 2015

(65) Prior Publication Data

US 2016/0023143 A1    Jan. 28, 2016

Related U.S. Application Data

(60) Provisional application No. 62/028,021, filed on Jul. 23, 2014.

(51) Int. Cl.
 *B01D 35/02* (2006.01)
 *B01D 29/21* (2006.01)
 *B01D 35/30* (2006.01)
 *E04H 4/12* (2006.01)

(52) U.S. Cl.
 CPC ............. *B01D 35/02* (2013.01); *B01D 29/21* (2013.01); *B01D 35/30* (2013.01); *B01D 35/306* (2013.01); *B01D 2201/0415* (2013.01); *B01D 2201/316* (2013.01); *B01D 2201/4084* (2013.01); *E04H 4/1209* (2013.01)

(58) Field of Classification Search
 CPC ........ B01D 35/02; B01D 29/21; B01D 35/30; B01D 35/306; B01D 2201/4084; B01D 2201/316; B01D 2201/0415; E04H 4/1209
 See application file for complete search history.

(56) References Cited

U.S. PATENT DOCUMENTS

| 3,154,485 A | 10/1964 | Liddell |
| 4,561,979 A | 12/1985 | Harms et al. |
| 4,834,423 A * | 5/1989 | DeLand .............. F16L 37/0987 285/317 |

(Continued)

FOREIGN PATENT DOCUMENTS

| JP | 2007291939 A | 11/2007 |
| WO | 2007110049 A1 | 10/2007 |

OTHER PUBLICATIONS

International Search Report of the International Searching Authority dated Oct. 30, 2015, issued in connection with International Patent Application No. PCT/US2015/041507 (3 pages).

(Continued)

*Primary Examiner* — Krishnan S Menon
*Assistant Examiner* — Waqaas Ali
(74) *Attorney, Agent, or Firm* — McCarter & English, LLP

(57) ABSTRACT

Disclosed herein is a filter for use in connection with a swimming pool or spa. A device is provided that has a tube inlet at the top of a vessel. A lower end of the device is connected directly to an outlet of the filter. The device is designed to divert all or the majority of the fluid to move to the top of the filter before exiting the vessel.

22 Claims, 12 Drawing Sheets

(56) References Cited

U.S. PATENT DOCUMENTS

| | | | |
|---|---|---|---|
| 5,190,651 A | | 3/1993 | Spencer et al. |
| 5,871,641 A | * | 2/1999 | Davidson ............... B01D 29/21 210/136 |
| 8,512,555 B1 | | 8/2013 | Allen, II et al. |
| 2007/0187306 A1 | | 8/2007 | Pecca |
| 2013/0319916 A1 | | 12/2013 | Hamza et al. |

OTHER PUBLICATIONS

Written Opinion of the International Searching Authority dated Oct. 30, 2015, issued in connection with International Patent Appln. No. PCT/US2015/041507 (5 pages).

Extended European Search Report issued in European Application No. EP 15 82 5349.2 dated Feb. 16, 2018 (7 pages).

* cited by examiner

GAS-EVACUATING FILTER

CROSS-REFERENCE TO RELATED APPLICATIONS

The present application claims the benefit of priority to U.S. Provisional Patent Application No. 62/028,021, filed on Jul. 23, 2014, which is incorporated by reference in its entirety.

FIELD OF THE DISCLOSURE

The present disclosure relates to a filter, and more particularly, to a device and method for evacuating gas from a filter.

BACKGROUND

Various types of fluid filters, such as a swimming pool filter, have been developed in the past. An example of a filter 10 is shown in FIG. 1, which includes a vessel 12 with an inlet 14 for receiving fluid to be filtered and an outlet 16 for discharging filtered fluid from the vessel 12. The filter 10 also includes a filter cartridge 18 positioned within the vessel 12. In operation, fluid is directed into the interior of the filter cartridge 18 from the inlet 14 of the vessel 12. The fluid flows through the filter cartridge 18 into a hollow interior defined by the filter cartridge 18. After passing through the filter cartridge 18, the fluid is discharged from the vessel 12 through the outlet 16. The filtered-out particulate remains in the filter cartridge 18.

Filters are known to accumulate gas or air pockets at the top of the vessel, which can then be compressed when the filter is in operation and pressurized. This compressed air can generate thrust when depressurized quickly and can cause unsecured features on the filter to separate. Accordingly, some filters, such as the filter 10, are provided with a scavenger tube 20 in an attempt to reduce or to eliminate gas or air pockets from the top of the vessel 12. The scavenger tube 20 utilizes the venturi effect to remove gas or air pockets at a high flow rate.

It would be desirable to provide a filter that reduces or eliminates the accumulation of gas or air pockets at any flow rate.

SUMMARY

In accordance with the present disclosure, a filter is provided for use in fluid systems (e.g., swimming pools or spas). The invention serves to remove or substantially reduce gas or air pockets that are formed in the vessel at any flow rate. In particular, the filter includes a tubular assembly that is positioned in a vessel. The tubular assembly has a tube inlet at the top of the vessel. A lower end of the tubular assembly is connected directly to an outlet of the filter. The tubular assembly provides a flow path between the tube inlet of the tubular assembly and the outlet of the filter. The tubular assembly is configured to affect the flow path of the fluid such that all or substantially all fluid is forced to enter the tube inlet of the tubular assembly before exiting the vessel. As a result of the diverted flow path, fluid is forced to move to the top of the filter before exiting the vessel.

In accordance with another embodiment, the tubular assembly has small vents or apertures that allow the passage of fluid therethrough. The small vents or apertures could be formed in a nozzle. While substantially all of the fluid is forced to move to the top of the filter in view of the tubular assembly, the vents or apertures allow a small percentage of fluid to pass therethrough.

In accordance with another embodiment, a filter cartridge has an evacuation tube attached thereto. The evacuation tube provides a flow path between the tube inlet of the evacuation tube and the outlet of the filter.

BRIEF DESCRIPTION OF THE DRAWINGS

For a more complete understanding of the present disclosure, reference is made to the following Detailed Description of the Exemplary Embodiment(s), considered in conjunction with the accompanying drawings, in which.

DETAILED DESCRIPTION OF EXEMPLARY EMBODIMENTS

Figure 1:
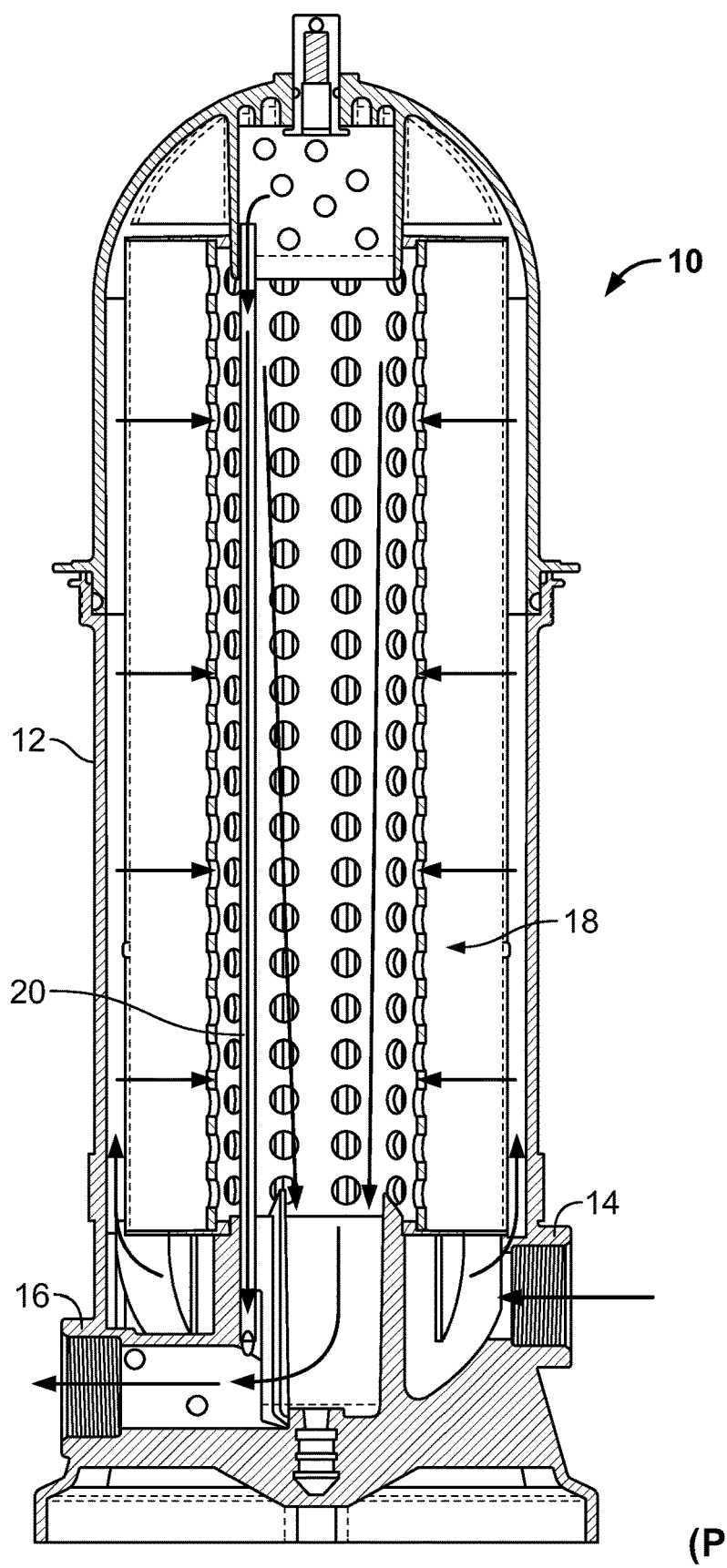
FIG. 1 is a cross-sectional view of a filter for a pool or spa of the prior art.
Figure 2:
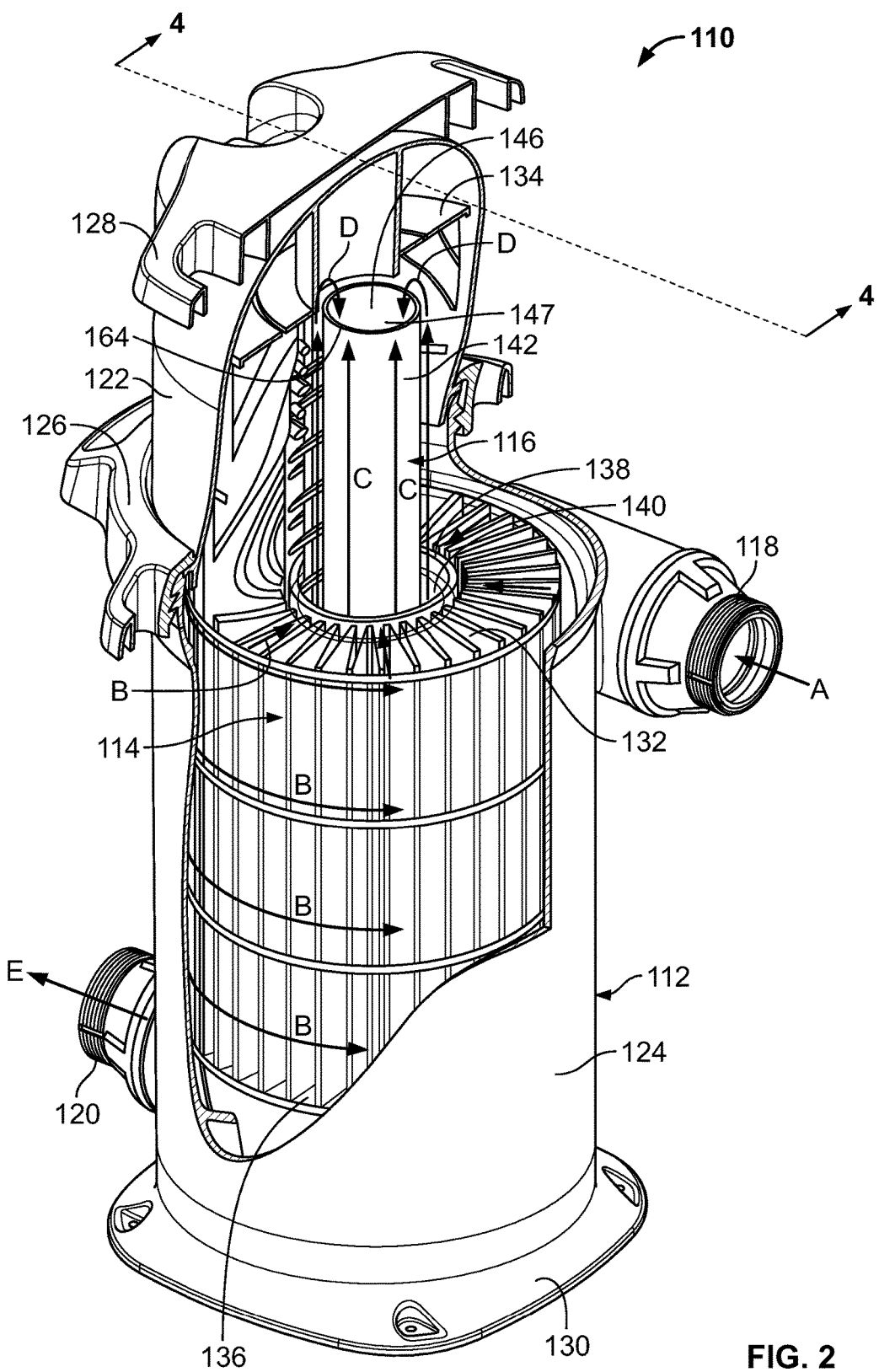
FIG. 2 is a perspective cutaway view showing a filter in accordance with the present disclosure.

FIG. 2 is a perspective view showing a filter 110 in accordance with the present disclosure. The filter 110 could be utilized for use in fluid systems (e.g., swimming pools, spas, and other recreational bodies of water). The filter 110 is adapted for removing particulate matter from a fluid stream passing through the filter 110. The filter 110 is equipped with a vessel 112, a cylindrical filter cartridge 114 sized and shaped to be received in the vessel 112, and a tubular assembly 116 positioned in the vessel 112. The filter 110 includes an inlet 118 for receiving fluid to be filtered and an outlet 120 for discharging filtered fluid from the vessel 112.

The vessel 112 includes an upper housing portion 122 and a lower housing portion 124 removably and sealably attached to the upper housing portion 122. The upper and lower housing portions 122, 124 facilitate assembly and maintenance of the filter 110. A clamp 126 could be used to secure the upper housing portion 122 to the lower housing portion 124. The vessel 112 could include handles 128. The bottom of the vessel 112 includes a flange 130 for mounting and securing the vessel 112.

The filter cartridge 114 has a pleated filter media 132 between end caps 134, 136 and a perforated center core 138 that defines a hollow interior 140. The filter cartridge 114 is made from suitable filtering media 132 (e.g., polypropylene, polyester, etc.) that permits the passage of fluid while inhibiting the passage of undesired particulate matter contained in the fluid.

The tubular assembly 116 includes a solid (e.g., non-perforated) elongate tube 142 and a nozzle 144 (see FIG. 4) vertically aligned with the tube 142 and attached to the tube 142, and defines an inner cavity 146 extending through the tube 142 and the nozzle 144. The tubular assembly 116 is positioned in the hollow interior 140 of the filter cartridge 114. The elongate tube 142 extends to the top of the vessel 112. The tubular assembly 116 is in communication with the outlet 120. In particular, the tubular assembly 116 has a tube inlet 147 at the top of the vessel 112. The tubular assembly 116 provides the only flow path or the majority of the flow path between the tube inlet 147 of the tubular assembly 116 and the outlet 120 of the filter 110.

Figure 3:
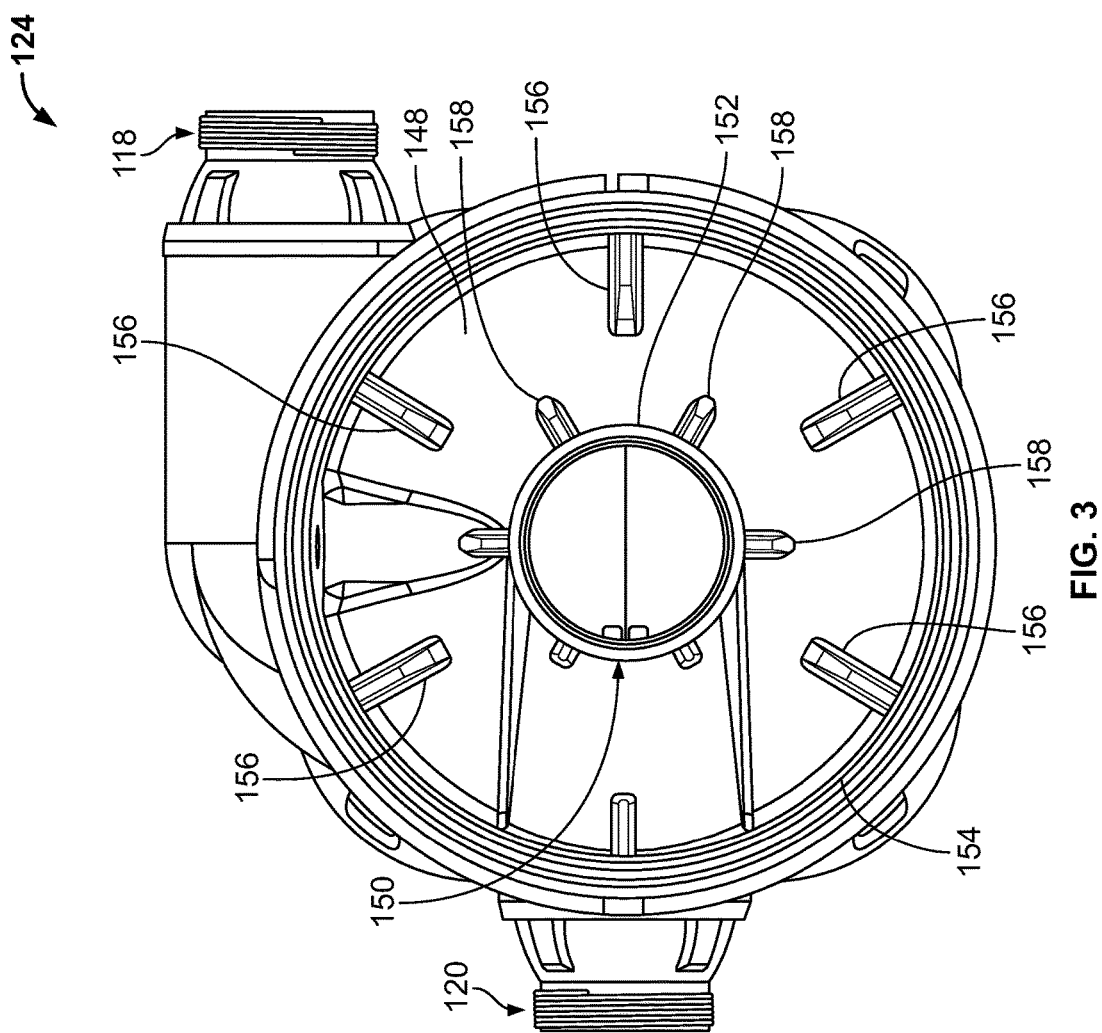
FIG. 3 is a top view of a vessel's lower half shown by itself.

FIG. 3 is a top view of the lower housing 124 of the vessel 112 itself showing the interior thereof. The lower housing 124 includes a bottom wall 148 and an outlet channel 150 extending from the center of the bottom wall 148 into the interior of the lower housing 124. The outlet channel 150 includes a vertical sidewall 152 that is concentric with a sidewall 154 of the lower housing 124. It will be understood that the vertical sidewall 152 does not have to be concentric with the sidewall 154. A lower end of the tubular assembly 116 (see FIG. 4) is in communication with the outlet channel 150.

The vessel 112 includes a plurality of outer standoffs 156 extending from the bottom wall 148 and the interior of the sidewall 154 of the vessel 112. A plurality of inner standoffs 158 extends from the bottom wall 148 of the vessel 112 and the outer surface of the sidewall 152 of the outlet channel 150.

Figure 4:
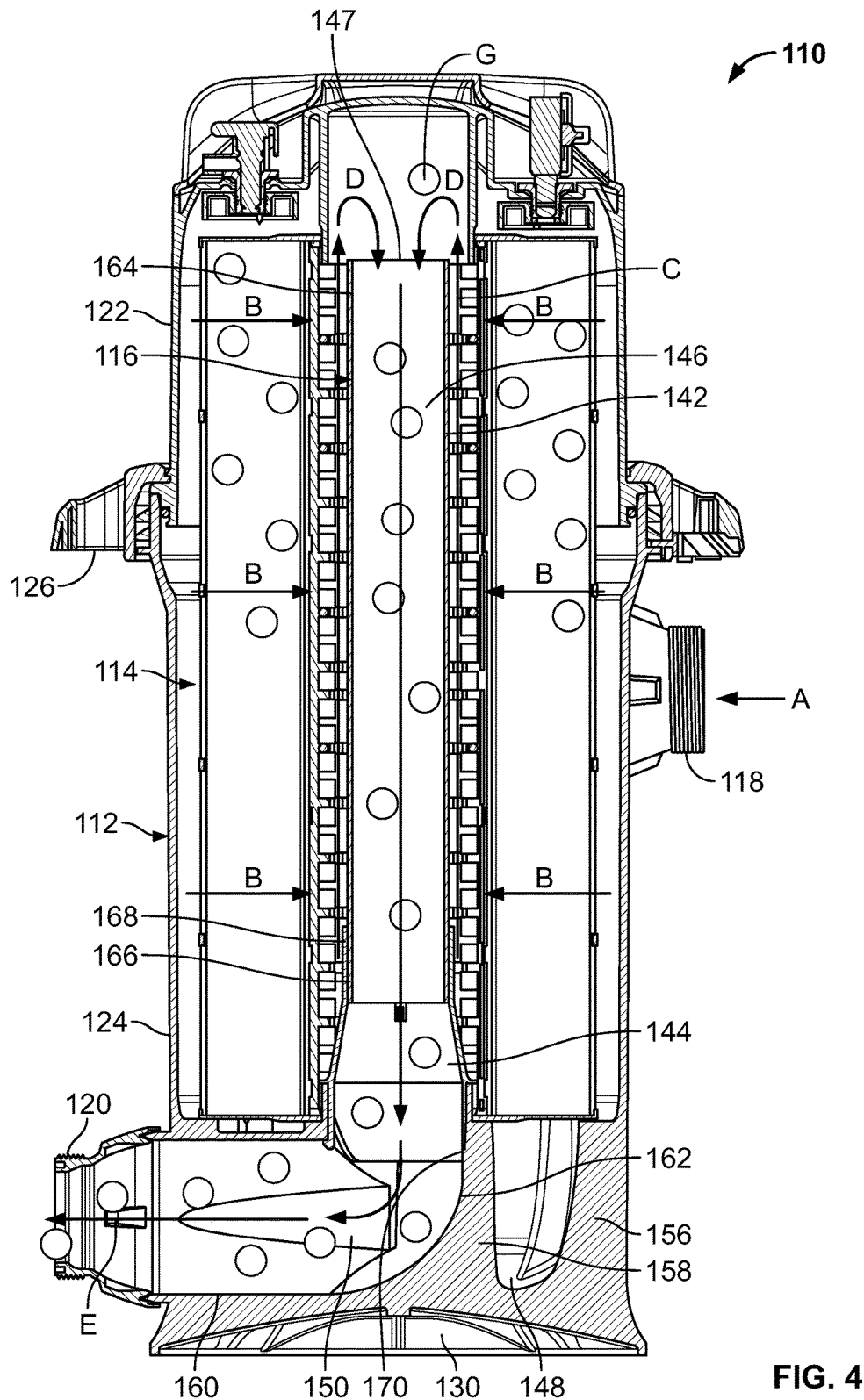
FIG. 4 is a cross-sectional view, taken along dashed lines 4-4, of the filter shown in FIG. 2.

FIG. 4 is a cross-sectional view of the filter 110, taken along dashed lines 4-4 of FIG. 2. The outlet channel 150 has a straight section 160 and a curved section 162 that serves to direct flow through the straight section 160 to the outlet 120. The outer standoffs 156 and the inner standoffs 158 support the filter cartridge 114. The nozzle 144 of the tubular assembly 116 is attached to the filter vessel 112, as will be described in further detail hereinafter. The tubular assembly 116 extends from the tube inlet 147 positioned at the top of the vessel 112 to the bottom of the vessel 112 at the outlet channel 150.

Figure 5:
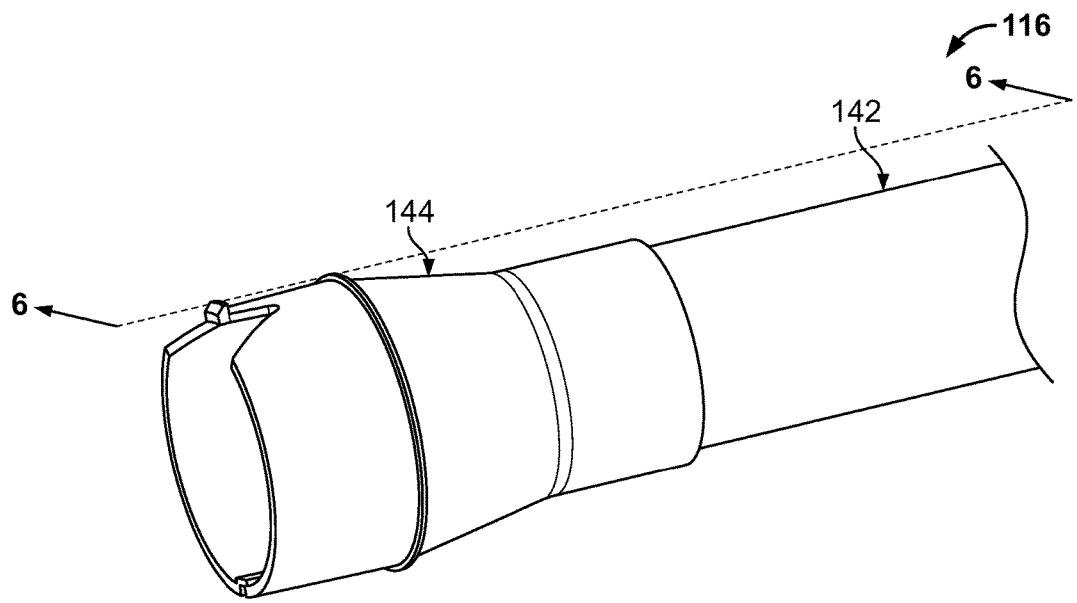
FIG. 5 is a perspective view of a tubular assembly.
Figure 6:
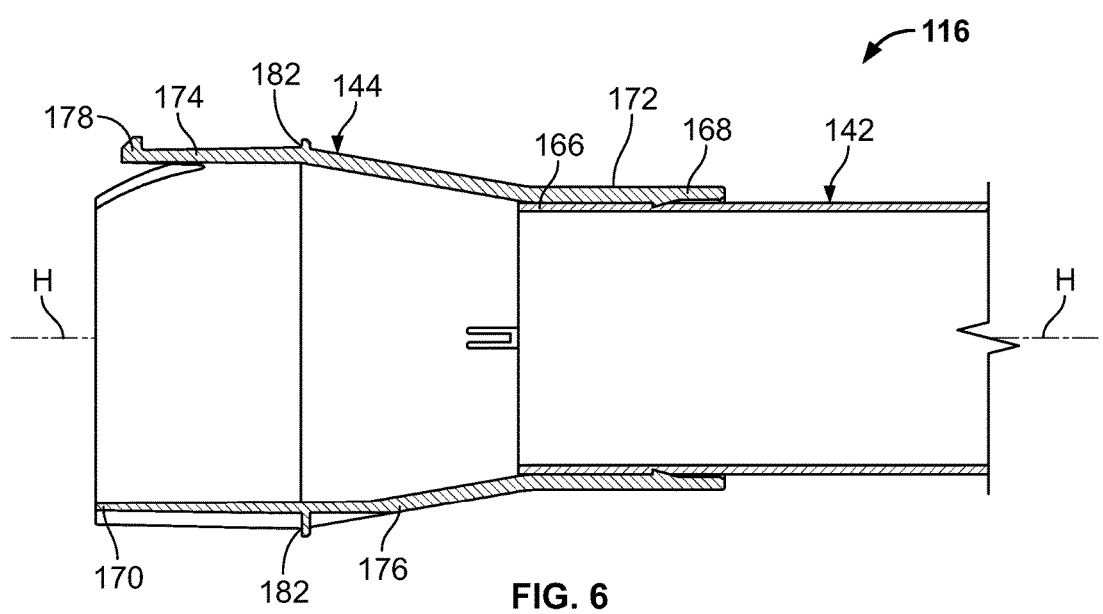
FIG. 6 is a cross-sectional view, taken along dashed lines 6-6, of the tubular assembly shown in FIG. 5.

FIG. 5 is a perspective view of the tubular assembly 116, and FIG. 6 is a cross-sectional view of the tubular assembly 116, taken along dashed lines 6-6 of FIG. 5. The tubular assembly defines a center axis H. The tube 142 of the tubular assembly 116 has an upper end 164 (see FIG. 2) at the tube inlet 147 of the tubular assembly 116 and a lower end 166. The nozzle 144 has an upper end 168 and a lower end 170.

The nozzle 144 has a mating section 172 that includes the upper end 168, an interlocking section 174, and a transition section 176 between the mating section 172 and the interlocking section 174. The mating section 172 has a diameter that is larger than the lower end 166 of the tube 142 such that the lower end 166 is fitted within the nozzle 144. The transition section 176 tapers outwardly toward the interlocking section 174 in a direction away from the center axis H. The interlocking section 174 includes the lower end 170 and a protrusion 178.

While the tubular assembly 116 is shown as having the tube 142 and the nozzle 144, it will be understood that the tubular assembly 116 could be formed as a single, unitary structure. It will also be understood that the tubular assembly 116 could be formed as part of the lower housing 124 of the vessel 112. While the tube 142 has a generally tubular or cylindrical shape, it will be understood that the tube 142 could have other shapes and configurations. It should also be understood that while the nozzle 144 may generally be conical in shape, it may have other shapes and configurations. Also, while the tubular assembly 116 is shown as having a solid (e.g., non-perforated) sidewall, it will be understood that small apertures or vents could be formed in the tube 142 or the nozzle 144.

Figure 7:
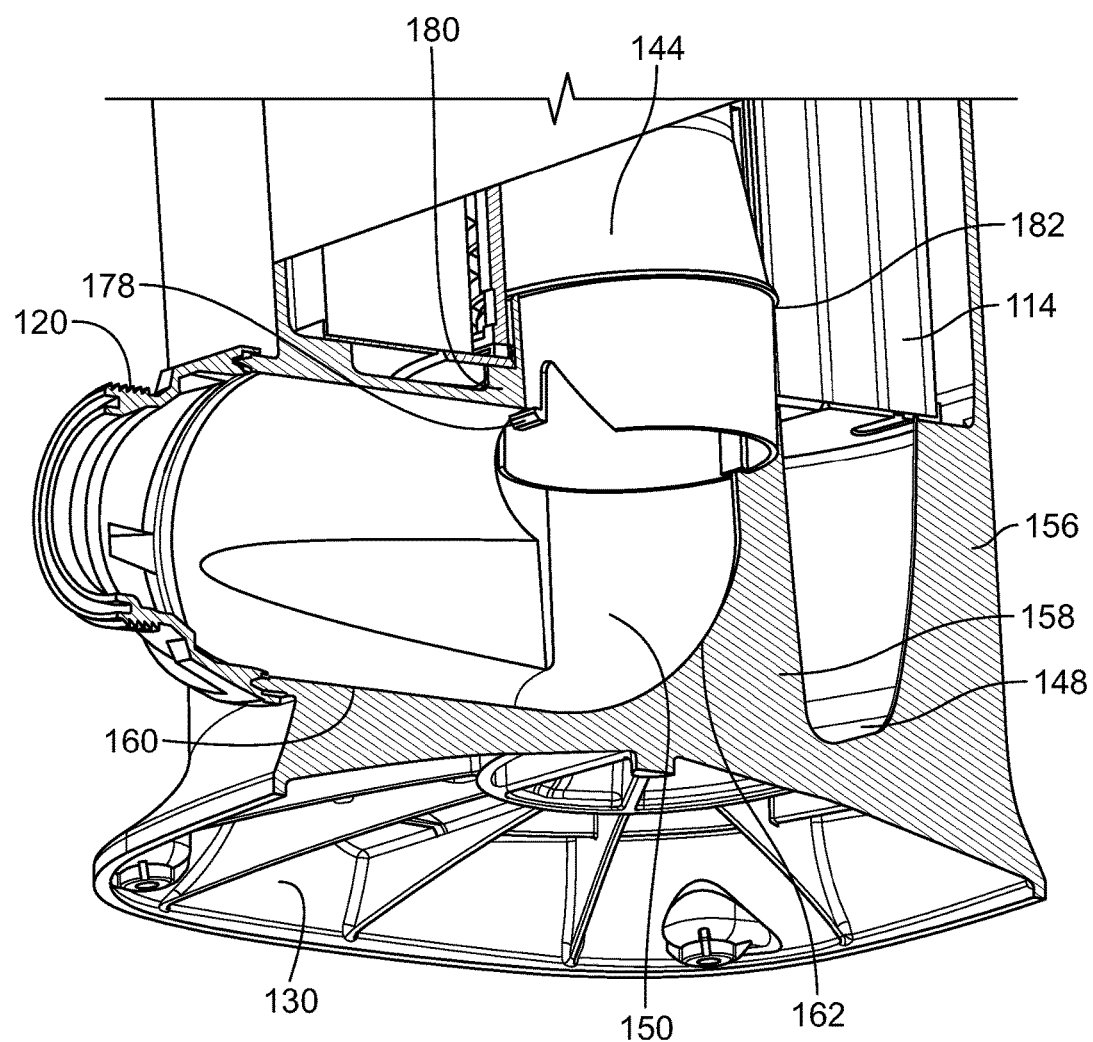
FIG. 7 is a cross-sectional view, showing the attachment of a nozzle to the vessel.

FIG. 7 is a cross-sectional view, showing the attachment of the nozzle 144 to the vessel 112 (see FIG. 4). The protrusion 178 of the nozzle 144 is sized to engage and snap-fit to a top wall 180 of the straight section 160 of the outlet channel 150. A flange 182 on the nozzle 144 is supported by the vertical sidewall 152 (see FIG. 3) located on the lower housing 124. It will be understood that any mechanism could be utilized to connect the tubular assembly 116 to the vessel 112.

In operation, fluid is directed into the interior of the filter cartridge 114 from the inlet 118 of the vessel 112 (as indicated by arrow A). The fluid then flows through the filter cartridge 114 (as indicated by arrow B). After passing through the filter cartridge 114, the fluid comes into contact with the tubular assembly 116. In this position, the fluid is prevented from leaking out because the tubular assembly 116 prevents the passage of fluid therethrough. The fluid fills the interior space of the vessel 112 and is forced to rise upwardly (as indicated by arrow C) before exiting the vessel 112. The fluid then flows into the tube inlet 147 and the inner cavity 146 of the tubular assembly 116 at the upper end 164 of the tube 142 (as indicated by arrow D). After flowing into the inner cavity 146, the fluid is discharged from the vessel 112 through the outlet 120 (as indicated by arrow E). The filtered-out particulate remains in the filter cartridge 114.

Because the fluid is forced to rise upwardly during the filtering process, the fluid comes into contact with any gas G or air pockets that have accumulated in the vessel 112. The fluid forces the accumulated gas G or air pockets to discharge from the vessel 112 at any flow rate.

The tubular assembly 116 affects the flow path of the fluid such that all or substantially all fluid is forced to enter the tube inlet 147 of the tubular assembly 116 before exiting the vessel 112. As a result of the diverted flow path, fluid is forced to move to the top of the filter 110 before exiting the vessel 112.

While the fluid is shown to flow vertically in the tubular assembly 116, the tubular assembly 116 could be configured such that the fluid flow could be in any other orientation. The fluid path to the outlet 120 could be varied. The tubular assembly 116 could serve as support for the filter cartridge 114. In particular, the tubular assembly 116 could serve as the center core for a filter cartridge without any core, and as support to prevent collapse of the filter cartridge 114.

Figure 8:
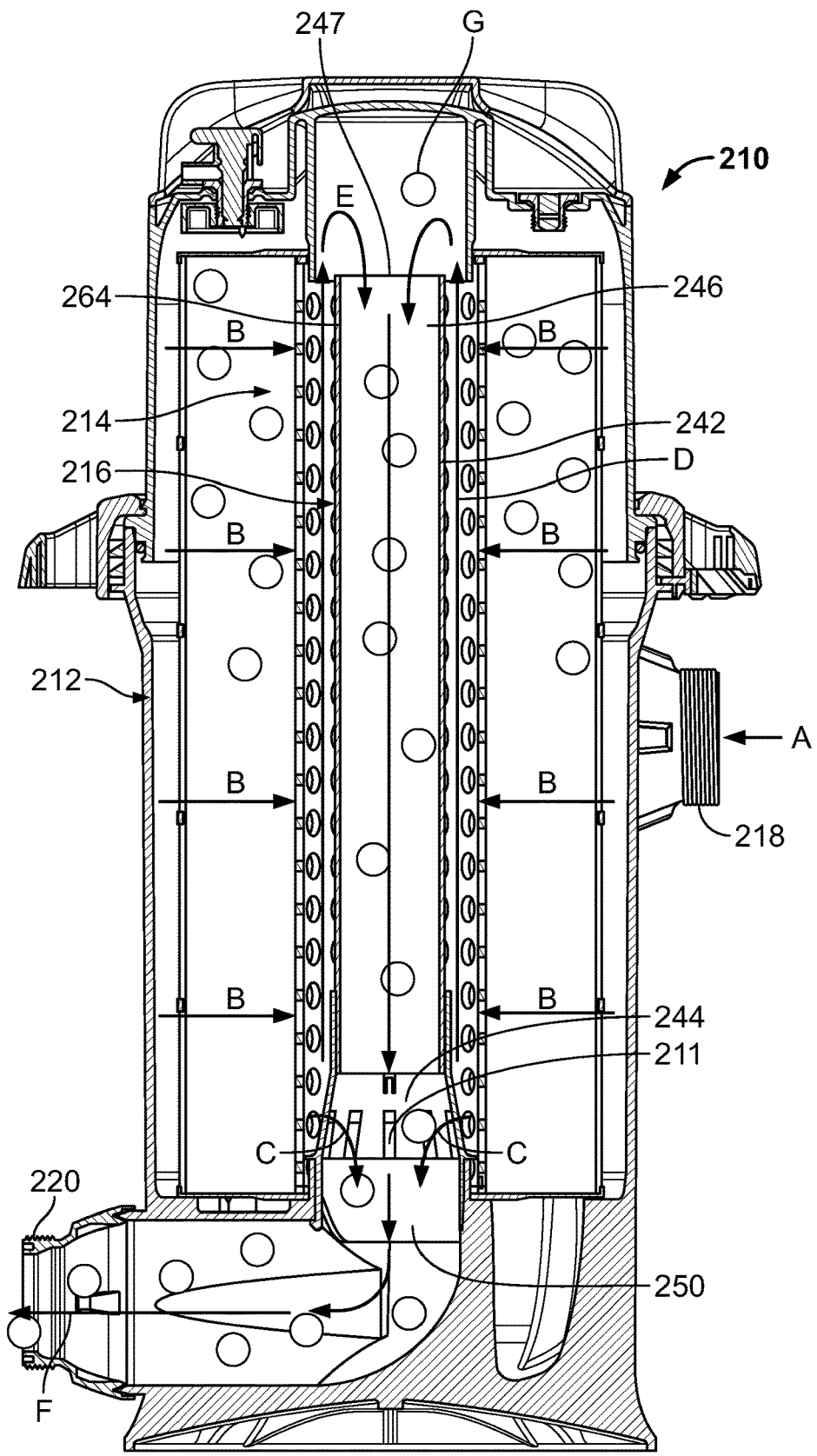
FIG. 8 is a cross-sectional view of a filter constructed in accordance with a second exemplary embodiment of the present disclosure.
Figure 9:
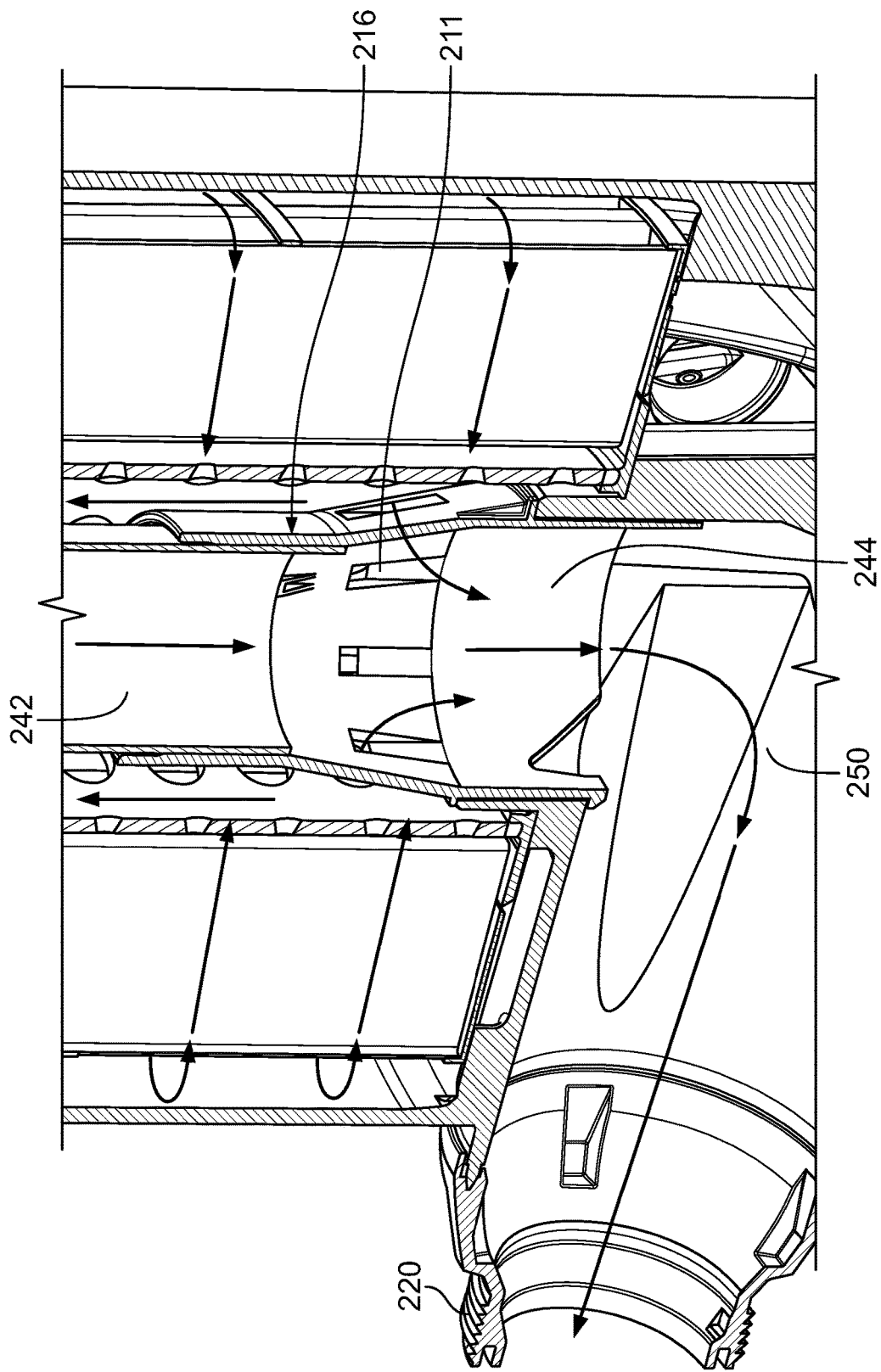
FIG. 9 is a cross-sectional view of the filter of FIG. 8, showing a nozzle with apertures.
Figure 10:
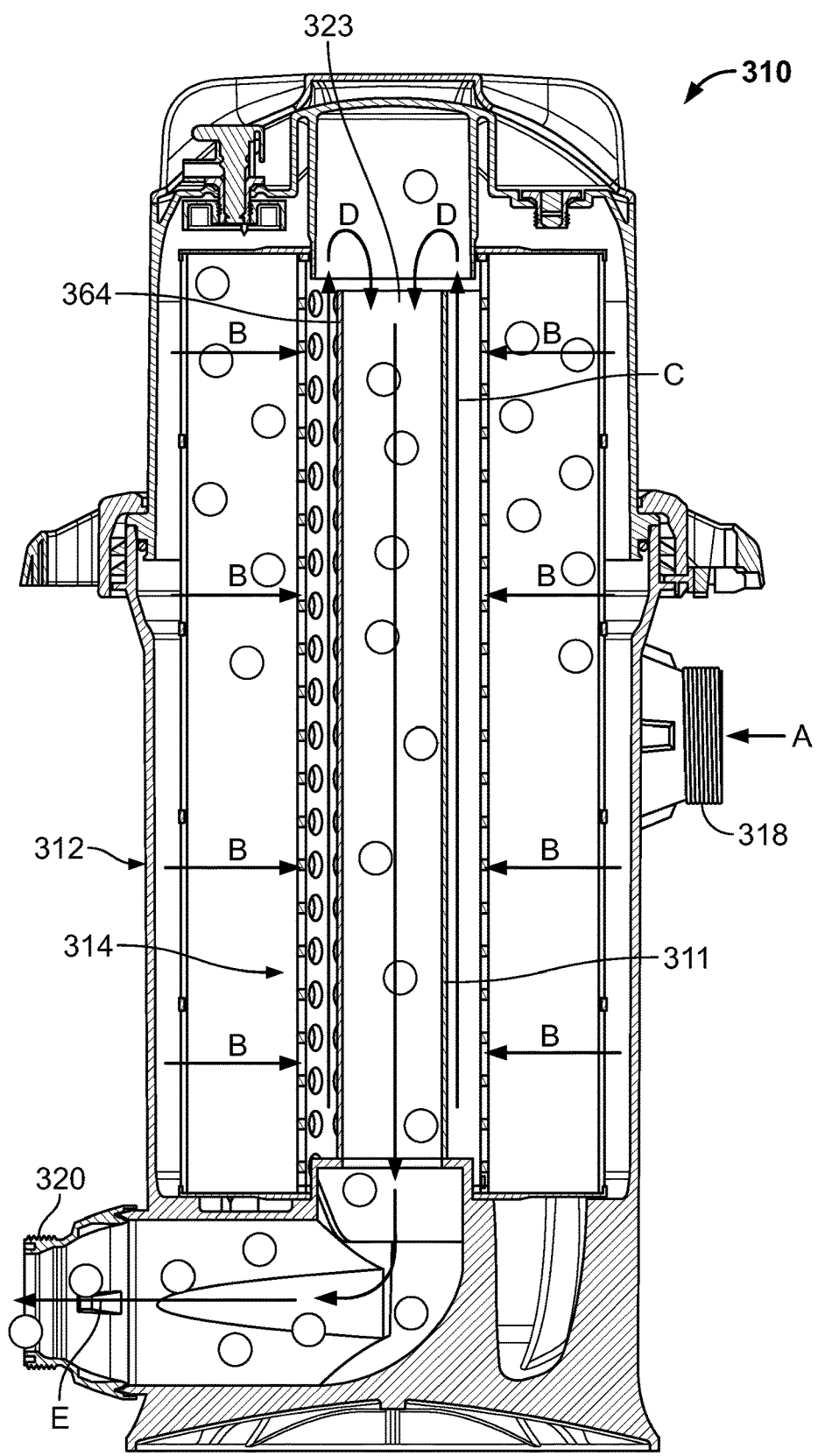
FIG. 10 is a cross-sectional view of a filter constructed in accordance with a third exemplary embodiment of the present disclosure.
Figure 11:
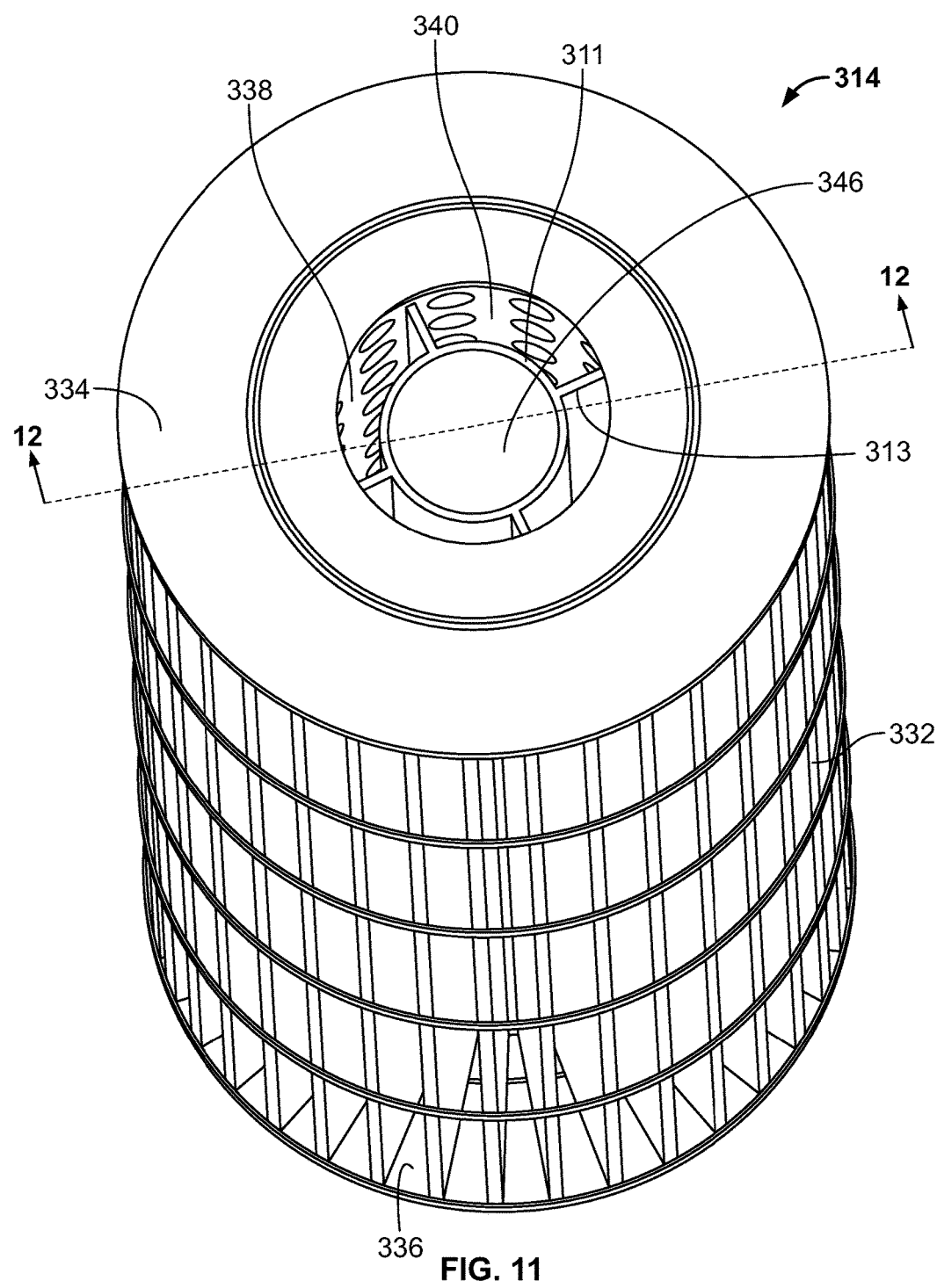
FIG. 11 is a perspective view of a filter cartridge utilized in the filter of FIG. 10.
Figure 12:
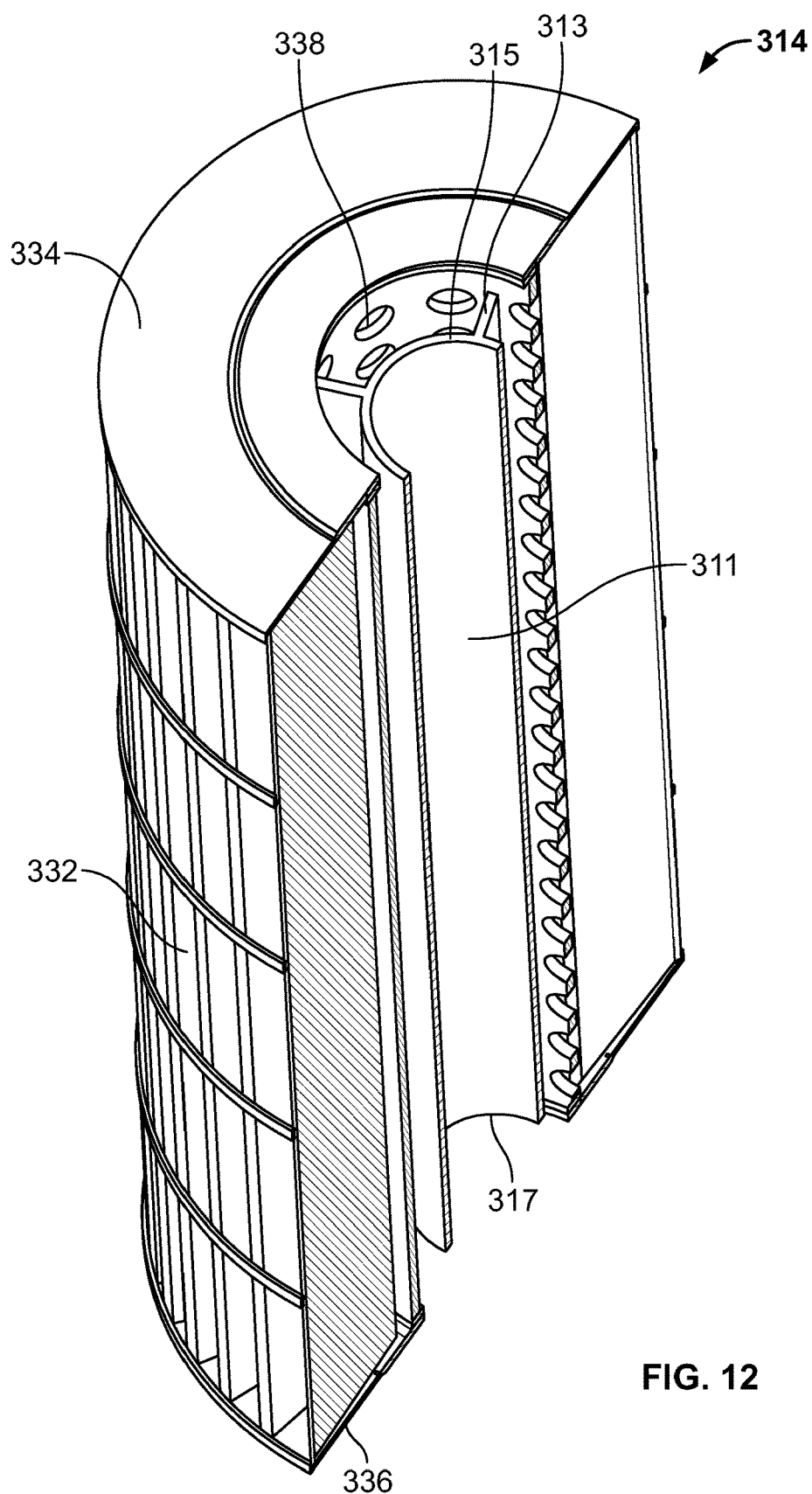
FIG. 12 is a cross-sectional view, taken along dashed lines 12-12, of the filter cartridge shown in FIG. 11.
Figure 13:
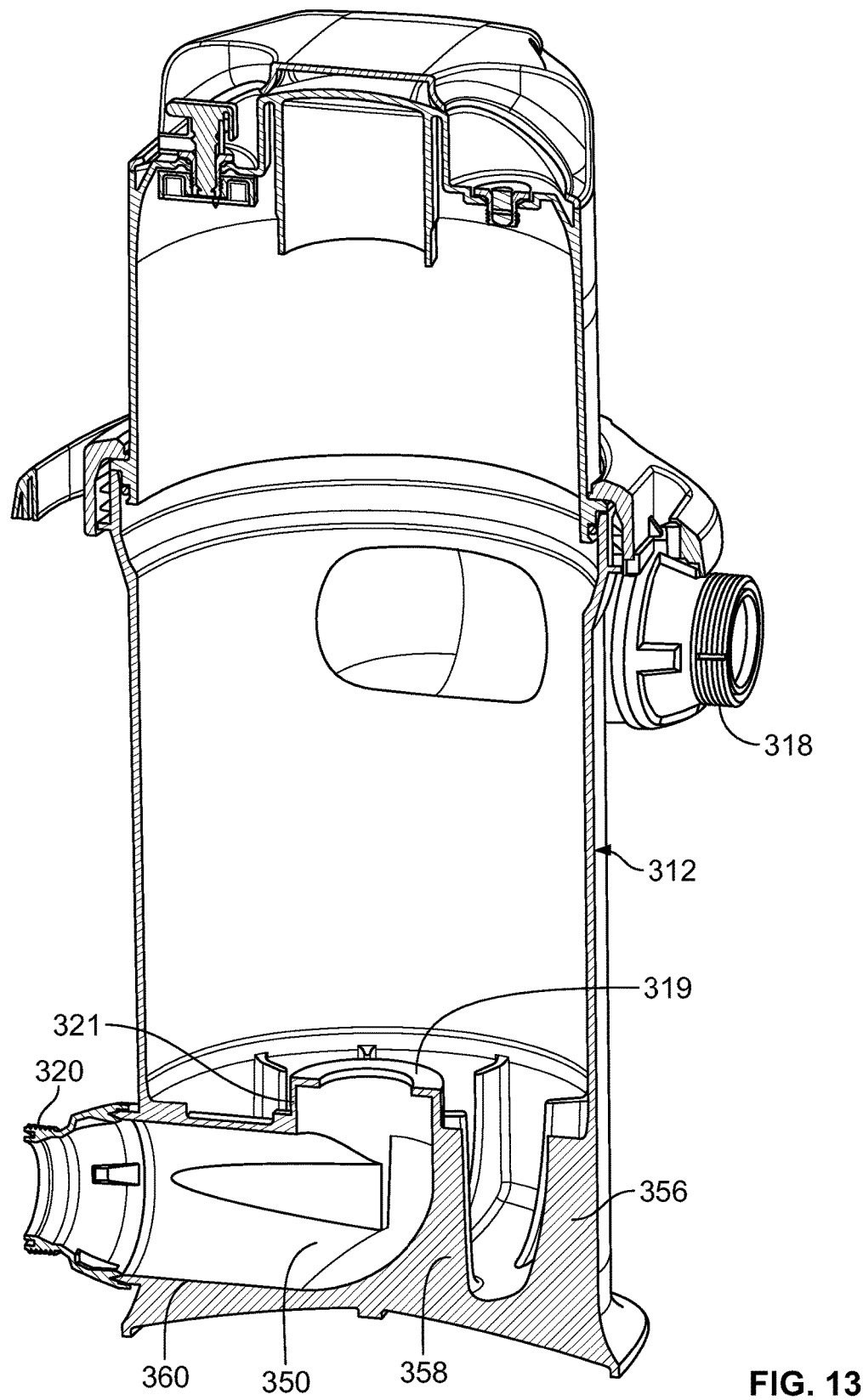
FIG. 13 is a cross-sectional view, showing the interior of a vessel utilized in the filter of FIG. 11.

FIGS. 8 and 9 show another embodiment of a filter, generally indicated as 210. The filter 210 operates and is constructed in manners consistent with the filter 110 shown in FIGS. 2-7, unless stated otherwise. Like the filter 110, the filter 210 is equipped with a vessel 212, a filter cartridge 214 sized and shaped to be received in the vessel 212, and a tubular assembly 216 positioned in the vessel 212. The tubular assembly 216 includes a solid (e.g., non-perforated) elongate tube 242 and a nozzle 244 with a plurality of radial vents or apertures 211.

While the nozzle 244 has a plurality of radial vents or apertures 211, it will be understood that the tubular assembly 216 could have other configurations. For example, the tube 242 could have small vents or apertures (not shown).

In operation, fluid is directed into the interior of the filter cartridge 214 from the inlet 218 of the vessel 212 (as indicated by arrow A). The fluid then flows through the filter cartridge 214 (as indicated by arrow B). After passing through the filter cartridge 214, the fluid comes into contact with the tubular assembly 216. A portion of the fluid flows through the apertures 211 of the nozzle 244 into the outlet channel 250 (as indicated by arrow C). The other portion of the fluid is prevented from leaking out because the tube 242 of the tubular assembly 216 prevents the passage of fluid therethrough. The tubular assembly 216 is configured to allow only a small percentage of fluid to pass through the nozzle 244. The other portion of the fluid fills the interior space of the vessel 212 and is forced to rise upwardly (as indicated by arrow D) before exiting the vessel 212. The fluid then flows into the tube inlet 247 and the inner cavity 246 of the tubular assembly 216 at the upper end 264 of the tube 242 (as indicated by arrow E). After flowing into the inner cavity 246, the fluid is discharged from the vessel 212 through the outlet 220 (as indicated by arrow F).

FIGS. 10-13 show another embodiment of a filter, generally indicated as 310. The filter is equipped with a vessel 312 and a filter cartridge 314 sized and shaped to be received in the vessel 312.

The filter cartridge 314 has a pleated filter media 332 between end caps 334, 336 and a perforated center core 338 that defines a hollow interior 340. An evacuation tube 311 is positioned within the hollow interior 340 and is attached to the filter cartridge 314. The evacuation tube 311 defines an inner cavity 346. While the evacuation tube 311 is shown as being solid, it will be understood that the evacuation tube 311 could have small apertures or vents.

A plurality of dividers 313 extends radially outward from the evacuation tube 311 to the center core 338 to attach the evacuation tube 311 to the filter cartridge 314. The dividers 313 extend between a top end 315 and a bottom end 317 of the evacuation tube 311. The evacuation tube 311 provides a flow path between the tube inlet 323 of the evacuation tube 311 and the outlet 320 of the filter 310.

While dividers 313 are illustrated, it will be understood that the filter cartridge 314 could be attached to the evacuation tube 311 utilizing other engagement mechanisms. While the evacuation tube 311 is shown having a single, unitary structure, it will be understood that the evacuation tube 311 could have any configuration. It will also be understood that the evacuation tube 311 could have other shapes.

The vessel 312 has a cylindrical mount 319 for supporting the evacuation tube 311. The cylindrical mount 319 extends from the inner standoffs 358 and the wall 321 defining the straight section 360 of the outlet channel 350. It will be understood that other mechanisms could be employed for supporting the evacuation tube 311.

In operation, fluid is directed into the interior of the filter cartridge 314 from the inlet 318 of the vessel 312 (as indicated by arrow A). The fluid then flows through the filter cartridge 314 (as indicated by arrow B). After passing through the filter cartridge 314, the fluid comes into contact with the evacuation tube 311. In this position, the fluid is prevented from leaking out because the evacuation tube 311 and the mount 319 prevent the passage of fluid therethrough. The fluid fills the interior space of the vessel 312 and is forced to rise upwardly (as indicated by arrow C) before exiting the vessel 312. The fluid then flows into the tube inlet 323 and the inner cavity 346 of the evacuation tube 311 at the upper end 364 (as indicated by arrow D). After flowing into the inner cavity 346, the fluid is discharged from the vessel 312 through the outlet 320 (as indicated by arrow E).

It is to be understood that the foregoing description is not intended to limit the spirit or scope of the disclosure. It will be understood that the aspects of the disclosure described herein are merely exemplary and that a person skilled in the art may make many variations and modification without departing from the spirit and scope of the disclosure. All such variations and modifications, including those discussed above, are intended to be included within the scope of the disclosure.

What is claimed is:

1. A filter for fluid systems, comprising:
   a vessel defining an inner chamber and having an inlet and an outlet in fluid communication with the inner chamber;
   a filter cartridge positioned within the inner chamber of the vessel; and
   a tubular assembly having an upper end including a tube inlet, a lower end, an inner cavity extending between the tube inlet and the lower end, an interlocking section for engaging a portion of the outlet, a flow path extending between the tube inlet to the outlet when the tubular assembly is engaged with the outlet, and a solid sidewall extending between the lower end and the upper end, the tubular assembly positioned within the filter cartridge and the inner chamber of the vessel so as to force at least a portion of fluid flowing through the filter to flow along the solid sidewall toward the upper end, through the tube inlet into the inner cavity, and through the tubular assembly flow path before exiting the outlet and forcing gas trapped in the vessel to be discharged from the vessel,
   wherein the tubular assembly includes one or more apertures that permit at least a portion of fluid flowing through the filter to flow into the inner cavity of the tubular assembly through the one or more apertures and exit the outlet without first entering the tube inlet.

2. The filter of claim 1, wherein the tubular assembly removably engages a top wall of the outlet to removably secure the tubular assembly to the vessel.

3. The filter of claim 2, wherein the interlocking section of the tubular assembly includes a protrusion that removably engages the top wall of the outlet with a snap-fit engagement.

4. The filter of claim 1, wherein the tubular assembly comprises a tube connected with a nozzle.

5. The filter of claim 4, wherein the nozzle includes a mating section for engaging the tube, the interlocking section for engaging a portion of the outlet, and a transition section extending between the mating section and the interlocking section.

6. The filter of claim 4, wherein the nozzle includes a protrusion that engages a top wall of the outlet with a snap-fit engagement to removably secure the nozzle to the vessel.

7. The filter of claim 1, wherein the tubular assembly is connected with the filter cartridge by at least one divider.

8. The filter of claim 1, wherein the vessel includes an upper housing portion and a lower housing portion removably attached to each other.

9. A filter for fluid systems, comprising:
a vessel defining an inner chamber and including an inlet, an outlet, and a top portion that accumulates gas pockets;
a tubular assembly including a tube inlet, a lower end, and a solid sidewall extending between the lower end and the tube inlet, the tubular assembly positioned within the inner chamber of the vessel such that the lower end is connected to the outlet and the tube inlet is positioned adjacent the top portion of the vessel, the tubular assembly forcing at least a portion of fluid flowing through the filter to flow along the solid sidewall toward the top portion of the vessel, through the tube inlet into the tubular assembly, and through the tubular assembly before exiting the vessel so as to force gas pockets accumulated in the top portion to be discharged from the vessel; and
a filter cartridge positionable within the inner chamber of the vessel and around the tubular assembly,
wherein the tubular assembly includes one or more apertures that permit at least a portion of fluid flowing through the filter to flow into the tubular assembly through the one or more apertures and exit the outlet without first entering the tube inlet.

10. The filter of claim 9, wherein the tubular assembly removably engages a top wall of the outlet to removably secure the tubular assembly to the vessel.

11. The filter of claim 9, wherein the tubular assembly comprises a tube connected with a nozzle.

12. The filter of claim 11, wherein the nozzle includes a mating section for engaging the tube, an interlocking section for engaging a portion of the outlet, and a transition section extending between the mating section and the interlocking section.

13. The filter of claim 11, wherein the nozzle includes a protrusion that engages a top wall of the outlet with a snap-fit engagement to removably secure the nozzle to the vessel.

14. The filter of claim 9, wherein the tubular assembly is connected with the filter cartridge by at least one divider.

15. The filter of claim 9, wherein the vessel includes an upper housing portion and a lower housing portion removably attached to each other.

16. A filter for fluid systems, comprising:
a vessel defining an inner chamber and including an inlet, an outlet, and a top portion that accumulates gas pockets;
a tubular assembly including a tube inlet, a lower end, a solid sidewall extending between the lower end and the tube inlet, and one or more apertures extending through the tubular assembly, the tubular assembly positioned within the inner chamber of the vessel such that the lower end is connected to the outlet and the tube inlet is positioned adjacent the top portion of the vessel;
a filter cartridge positionable within the inner chamber of the vessel and around the tubular assembly;
a first flow path extending from the inlet to the inner chamber of the vessel;
a second flow path extending through the filter cartridge and to the tubular assembly, the second flow path in fluidic communication with the first flow path;
a third flow path extending along an exterior of the solid sidewall of the tubular assembly toward the top portion of the vessel, the third flow path in fluidic communication with the second flow path;
a fourth flow path extending through the top portion of the vessel and into the tubular assembly through the tube inlet, the fourth flow path in fluidic communication with the third flow path and forcing gas pockets accumulated in the top portion of the vessel to enter the tubular assembly;
a fifth flow path extending through the interior of the tubular assembly and exiting the vessel through the outlet, the fifth flow path in fluidic communication with the fourth flow path and discharging the fluid and any gas pockets out from the vessel, and
a sixth flow path extending from the inner chamber of the vessel and across the one or more apertures to the interior of the tubular assembly, the sixth flow path in fluidic communication with the fifth flow path and permitting at least a portion of fluid flowing through the filter to flow into the tubular assembly through the one or more apertures and exit the outlet without first entering the tube inlet.

17. The filter of claim 16, wherein the tubular assembly removably engages a top wall of the outlet to removably secure the tubular assembly to the vessel.

18. The filter of claim 16, wherein the tubular assembly comprises a tube connected with a nozzle.

19. The filter of claim 18, wherein the nozzle includes a mating section for engaging the tube, an interlocking section for engaging a portion of the outlet, and a transition section extending between the mating section and the interlocking section.

20. The filter of claim 18, wherein the nozzle includes a protrusion that engages a top wall of the outlet with a snap-fit engagement to removably secure the nozzle to the vessel.

21. The filter of claim 16, wherein the tubular assembly is connected with the filter cartridge by at least one divider.

22. The filter of claim 16, wherein the vessel includes an upper housing portion and a lower housing portion removably attached to each other.

* * * * *